United States Patent
Zhang et al.

(10) Patent No.: US 11,088,631 B2
(45) Date of Patent: Aug. 10, 2021

(54) THREE-LEVEL DC-DC CONVERTER AND VOLTAGE BALANCING CIRCUIT THEREOF

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/424,636

(22) Filed: May 29, 2019

(65) Prior Publication Data
US 2019/0379287 A1  Dec. 12, 2019

(30) Foreign Application Priority Data
Jun. 8, 2018  (CN) .......................... 201810587376.5

(51) Int. Cl.
*H02M 7/48* (2007.01)
*H02M 7/487* (2007.01)
*H02M 3/158* (2006.01)
*H02M 3/07* (2006.01)

(52) U.S. Cl.
CPC ............. *H02M 7/487* (2013.01); *H02M 3/07* (2013.01); *H02M 3/158* (2013.01)

(58) Field of Classification Search
CPC ........... H02M 3/15–3/158; H02M 3/07–3/073; H02M 7/487
See application file for complete search history.

(56) References Cited

U.S. PATENT DOCUMENTS

| | | |
|---|---|---|
| 5,581,454 A | 12/1996 | Collins |
| 7,696,735 B2 | 4/2010 | Oraw et al. |
| 7,907,429 B2 | 3/2011 | Ramadass et al. |
| 8,427,113 B2 | 4/2013 | King et al. |
| 8,687,382 B2 | 4/2014 | Chen |
| 8,729,819 B2 | 5/2014 | Zhou et al. |
| 8,917,528 B2 | 12/2014 | Xu |
| 9,287,782 B2 | 3/2016 | Chen |
| 9,473,034 B2 | 10/2016 | Huang et al. |
| 9,762,128 B2 | 9/2017 | Zhang et al. |
| 9,853,460 B2 | 12/2017 | Ichikawa et al. |
| 9,866,113 B1 * | 1/2018 | Assaad .................. H02M 3/07 |

(Continued)

FOREIGN PATENT DOCUMENTS

WO  2015030152 A1  3/2015

*Primary Examiner* — Rafael O De León Domenech
(74) *Attorney, Agent, or Firm* — Michael C. Stephens, Jr.

(57) ABSTRACT

A three-level DC-DC converter can include: first and second switches successively coupled between a first terminal of an input port and a middle terminal; third and fourth switches successively coupled between the middle terminal and a second terminal of the input port; a flying capacitor coupled between a common node of the first and second switches and a common node of the third and fourth switches; and a voltage balancing circuit configured to adjust a charge amount or a discharge amount of the flying capacitor based on an error signal characterizing an error between a voltage across the flying capacitor and a predetermined value, in order to maintain the voltage across the flying capacitor within a predetermined range, where the predetermined value is within the predetermined range.

18 Claims, 8 Drawing Sheets

(56) References Cited

U.S. PATENT DOCUMENTS

| | | | |
|---|---|---|---|
| 9,929,653 B1* | 3/2018 | Mercer | H02M 3/158 |
| 10,090,763 B1* | 10/2018 | Mercer | H02M 3/1582 |
| 10,224,803 B1* | 3/2019 | Rainer | H02M 1/083 |
| 10,340,794 B1* | 7/2019 | Zhang | H02M 3/073 |
| 2009/0316443 A1 | 12/2009 | Coccia et al. | |
| 2012/0300519 A1 | 11/2012 | Clemmons et al. | |
| 2013/0181620 A1 | 7/2013 | Zhao | |
| 2013/0201730 A1 | 8/2013 | Luo | |
| 2013/0265016 A1 | 10/2013 | Chang et al. | |
| 2018/0198367 A1 | 7/2018 | Zhang et al. | |
| 2019/0020274 A1* | 1/2019 | Li | H02M 3/07 |
| 2019/0058385 A1* | 2/2019 | Lazaro | H02M 1/08 |
| 2019/0058397 A1* | 2/2019 | Lazaro | H02M 3/158 |
| 2020/0021196 A1* | 1/2020 | Scoones | H02M 3/1588 |

* cited by examiner

THREE-LEVEL DC-DC CONVERTER AND VOLTAGE BALANCING CIRCUIT THEREOF

RELATED APPLICATIONS

This application claims the benefit of Chinese Patent Application No. 201810587376.5, filed on Jun. 8, 2018, which is incorporated herein by reference in its entirety.

FIELD OF THE INVENTION

The present invention generally relates to the field of power electronics, and more particularly to three-level direct current-direct current (DC-DC) converters and associated voltage balancing circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
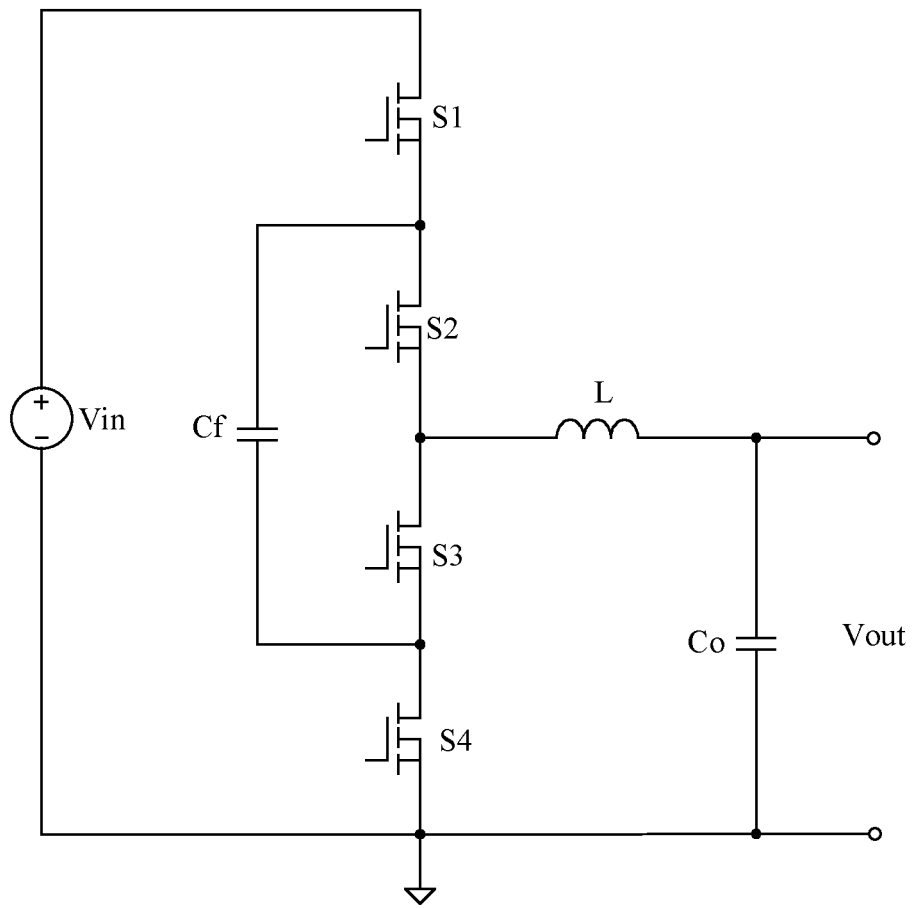
FIG. 1 is a schematic block diagram of an example three-level DC-DC converter.

Referring now to FIG. 1, shown is a schematic block diagram of an example three-level DC-DC converter. In this example, the three-level DC-DC converter can include switches S1-S4, flying capacitor Cf, magnetic component L, and output capacitor Co. Switching control signals for switches S1 and S4 are complementary and switching control signals for switches S2 and S3 are complementary. Also, the duty cycles of the switching control signals for switches S1 and S2 are the same, and the phase difference between the switching control signals for switches S1 and S2 is 180°. Thus, the voltage stress of switches S1-S4 can be reduced to half of input voltage Vin and the frequency of the current flowing through the magnetic component can be increased, thereby reducing the power consumption and the cost of the circuit manufacturing. However, due to effects, such as the parasitic parameters in the circuit, and errors in the devices, the voltage across flying capacitor Cf may be greater than ½Vin or less than ½Vin, such that the current flowing through magnetic component L May be unstable, thereby reducing the reliability of the overall circuit.

In one embodiment, a three-level DC-DC converter can include: (i) first and second switches successively coupled between a first terminal of an input port and a middle terminal; (ii) third and fourth switches successively coupled between the middle terminal and a second terminal of the input port; (iii) a flying capacitor coupled between a common node of the first and second switches and a common node of the third and fourth switches; and (iv) a voltage balancing circuit configured to adjust a charge amount or a discharge amount of the flying capacitor based on an error signal characterizing an error between a voltage across the flying capacitor and a predetermined value, in order to maintain the voltage across the flying capacitor within a predetermined range, where the predetermined value is within the predetermined range.

Figure 2:
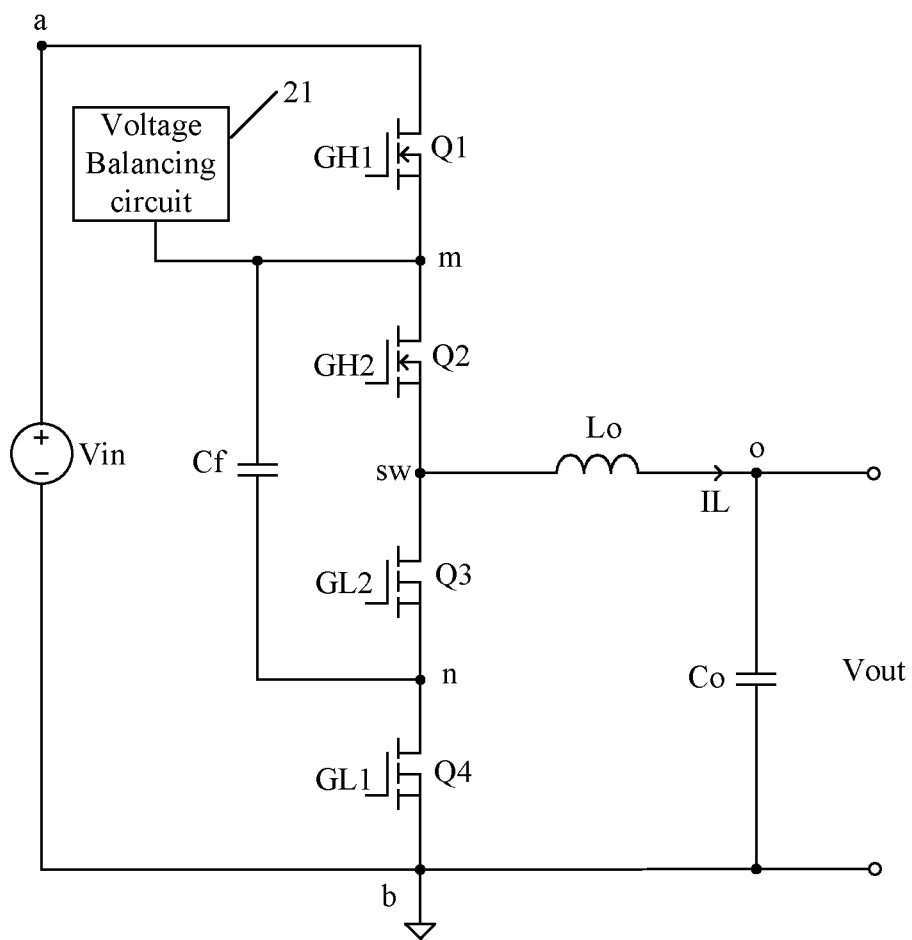
FIG. 2 is a schematic block diagram of an example three-level DC-DC converter, in accordance with embodiments of the present invention.

Referring now to FIG. 2, shown is a schematic block diagram of an example three-level DC-DC converter, in accordance with embodiments of the present invention. In this example, the three-level DC-DC converter can include voltage balancing circuit 21, switches Q1-Q4, flying capacitor Cf, magnetic component Lo, and output capacitor Co. Switches Q1 and Q2 may be successively coupled between terminal "a" of an input port and middle terminal sw, and switches Q3 and Q4 can be successively coupled between middle terminal sw and terminal "b" of the input port (e.g., the ground terminal). Flying capacitor Cf can connect between terminal "m" and terminal "n," where terminal m is a common node of switches Q1 and Q2, and terminal n is a common node of switches Q3 and Q4. Magnetic component Lo can connect between middle terminal sw and terminal o of an output port. Output capacitor Co can connect between two terminals of the output port.

In this example, switching control signals GH1 and GL1 for respectively controlling switches Q1 and Q4 may be complementary, and switching control signals GH2 and GL2 for respectively controlling switches Q2 and Q3 may also be complementary. That is, while switch Q1 is turned on, switch Q4 is turned off, and vice versa. Similarly, while switch Q2 is turned on, switch Q3 is turned off, and vice versa. Also for example, the duty cycles of switching control signals GH1 and GH2 may be the same, and the phase difference between switching control signals GH1 and GH2 can be 180°.

In this particular example, voltage balancing circuit 21 can adjust the charge amount of flying capacitor Cf during the charge stage, or the discharge amount of flying capacitor Cf during the discharge stage based on an error signal for characterizing an error between a voltage across flying capacitor Cf and a predetermined value, in order to maintain the voltage across flying capacitor Cf to be within a predetermined range. The predetermined value can be set within the predetermined range. In this example, the predetermined value can be Vin/2, where Vin is an input voltage of the three-level DC-DC converter.

Also, voltage balancing circuit 21 may further charge and discharge flying capacitor Cf by forming an additional charging current path and an additional discharging current path, such that the voltage across flying capacitor Cf can be maintained within the predetermined range. In this example, flying capacitor Cf can be controlled by voltage balancing circuit 21 to be additionally charged and discharged based on a sampling signal for characterizing the voltage across flying capacitor Cf and a parameter for characterizing the predetermined value, in order to maintain the voltage across flying capacitor Cf within the predetermined range.

In this example, when switch Q4 is turned on, flying capacitor Cf can be controlled by voltage balancing circuit 21 to be additionally discharged when the sampling signal is greater than a parameter for characterizing the upper limit of the predetermined value, and to be additionally charged when the first sampling signal is less than a parameter for characterizing the lower limit of the predetermined value, such that the voltage across flying capacitor Cf can be maintained within the predetermined range. For example, when switch Q4 is turned on, flying capacitor Cf can be controlled by voltage balancing circuit 21 to be additionally discharged when the sampling signal is greater than a parameter for charactering the predetermined value, and to be additionally charged when the first sampling signal is less than the parameter for charactering the predetermined value, such that the voltage across flying capacitor Cf can be maintained within the predetermined range.

In this example, voltage balancing circuit 21 can adjust the charge amount of flying capacitor Cf during the charge stage and the discharge amount of flying capacitor Cf during the discharge stage by adjusting current IL of magnetic component Lo during a charge stage or a discharge stage of flying capacitor Cf, such that the voltage across flying capacitor Cf can be maintained within the predetermined range. Further, voltage balancing circuit 21 can adjust the phase difference between switching control signals GH1 and GL1 respectively for switches Q1 and Q2, in order to adjust current IL of magnetic component Lo during the charge stage or the discharge stage of flying capacitor Cf. In this way, the charge amount and the discharge amount of flying capacitor Cf can be adjusted, in order to maintain the voltage of flying capacitor Cf within the predetermined range.

In this example, the phase difference between switching control signals GH1 and GL1 can be adjusted by voltage balancing circuit 21 based on the error signal. Further, the phase difference between switching control signals GH1 and GL1 can be controlled to increase when the error signal increases, and to decrease when the error signal decreases, such that the voltage across flying capacitor Cf can be maintained within the predetermined range. It should be understood that, though switches Q1-Q4 are metal-oxide-semiconductor transistors (MOSFETs) in this particular example, other electrically controlled switching devices (e.g., bipolar junction transistors [BJTs], insulated gate bipolar transistors [IGBTs], etc.) can additionally or alternatively be applied as switches here.

From the above, the charge amount of the flying capacitor of the three-level DC-DC converter during the charge stage, or the discharge amount of the flying capacitor during the discharge stage, can be adjusted based on the error between the voltage across the flying capacitor and the predetermined value. In this way, the voltage across the flying capacitor can be maintained to be within the predetermined range, thereby reducing the voltage stress of each switch of the DC-DC converter and improving the reliability of the system.

Figure 3:
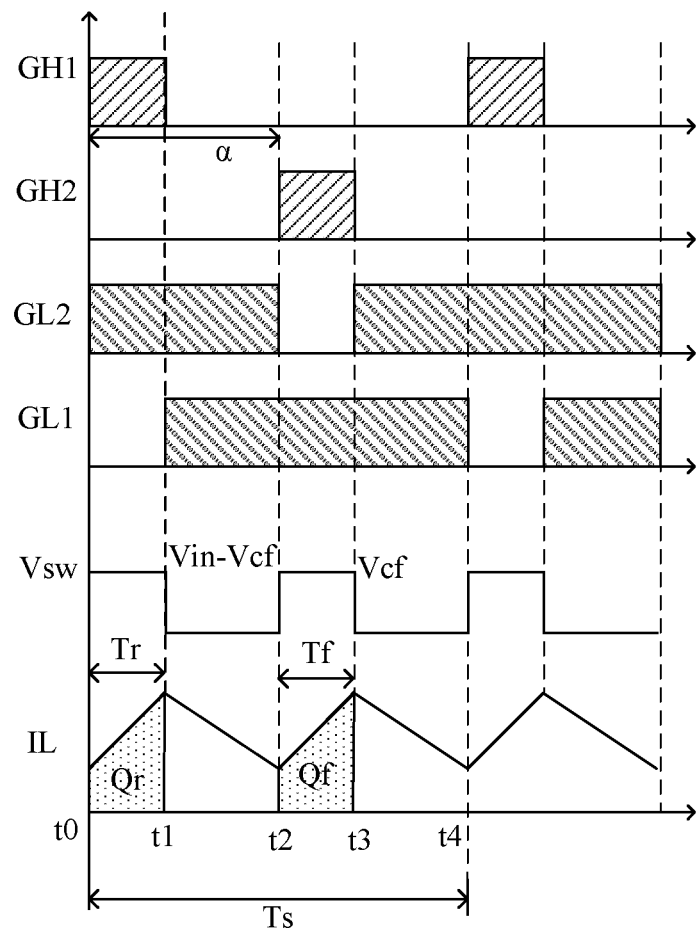
FIG. 3 is a waveform diagram of an example operation of the three-level DC-DC converter, in accordance with embodiments of the present invention.

Referring now to FIG. 3, shown is a waveform diagram of an example operation of the three-level DC-DC converter, in accordance with embodiments of the present invention. In this example, periods of the switching control signals for switches Q1-Q4 are all equal to be period Ts. Duty cycles of switching control signals GH1 and GH2, respectively, for switches Q1 and Q2 may both be equal to duty cycle D (e.g., less than 0.5). Also, duty cycle D may be a ratio of the conduction period of switch Q1 (e.g., the period during which switching control signal GH1 is at a high level) and period Ts. The phase difference of switching control signals GH1 and GH2 is $\alpha$.

During one period Ts, the three-level DC-DC converter can operate in four operation states. In the first operation state (e.g., during period t0-t1), switching control signals GH1 and GL2 can be at high levels, and switching control signals GH2 and GL1 may be at low levels. Thus, switches Q1 and Q3 can be turned on, while switches Q2 and Q4 are turned off. Then, flying capacitor Cf can be charged by input voltage Vin, such that voltage Vsw at middle terminal sw is Vin-Vcf, in which Vcf is the voltage across flying capacitor Cf, and current IL of magnetic component Lo may gradually increase. The first operation state may also be the charge stage of flying capacitor Cf.

In the second operation state (e.g., during period t1-t2), switching control signals GL1 and GL2 may be at high levels, and switching control signals GH1 and GH2 can be at low levels. Thus, switches Q3 and Q4 may be turned on, while switches Q1 and Q2 are turned off. Then, voltage Vsw at middle terminal sw may be zero, and current IL of magnetic component Lo can pass in a forward direction through switches Q3 and Q4, and gradually decrease.

In the third operation state (e.g., during period t2-t3), switching control signals GH2 and GL1 may be at high levels, and switching control signals GH1 and GL2 can be at low levels. Thus, switches Q2 and Q4 may be turned on, while switches Q1 and Q3 are turned off. Then, flying capacitor Cf may supply power to the load through magnetic component Lo, such that voltage Vsw at middle terminal sw is Vcf, and current IL of magnetic component Lo can gradually increase. The third operation state may also be the discharge stage of flying capacitor Cf.

In the fourth operation state (e.g., during period t3-t4), switching control signals GL1 and GL2 may be at high levels, and switching control signals GH1 and GH2 can be at low levels. Thus, switches Q3 and Q4 may be turned on, while switches Q1 and Q2 are turned off. Then, voltage Vsw at middle terminal sw may be zero, and current IL of magnetic component Lo can continue to flow in forward direction through switches Q3 and Q4, and may gradually decrease by freewheeling. Therefore, when voltage Vcf across flying capacitor Cf is stable, the three-level DC-DC converter can generate a stable output voltage. It should be understood that voltage Vsw at middle terminal sw during period t0-t1 may be equal to that during period t2-t3, that is, Vin-Vcf=Vcf, so Vcf=½Vin. Thus, the voltage across flying capacitor can be maintained at ½Vin, in order to improve the reliability of the system.

Due to parasitic parameters in the circuit, and errors in each device (e.g., different rising edges and falling edges of the switching devices, delays of the switching control signals, etc.), the duty cycles of the switching control signals for switches Q1 and Q2 may be different. Thus, charge amount Qr of flying capacitor Cf during the charge stage and discharge amount Qf of flying capacitor Cf during the discharge stage in one period Ts may be imbalanced due to the inconsistent duty cycles (e.g., mismatch in charge and discharge time), such that the voltage across flying capacitor Cf may not be easily maintained to be within the predetermined range. To solve the above problem, voltage balancing circuit 21 can adjust charge amount Qr of flying capacitor Cf during the charge stage and discharge amount Qf of flying capacitor Cf during the discharge stage based on the error between the voltage across the flying capacitor and the predetermined value, in order to maintain the voltage across flying capacitor Cf to be within the predetermined range.

Figure 4:
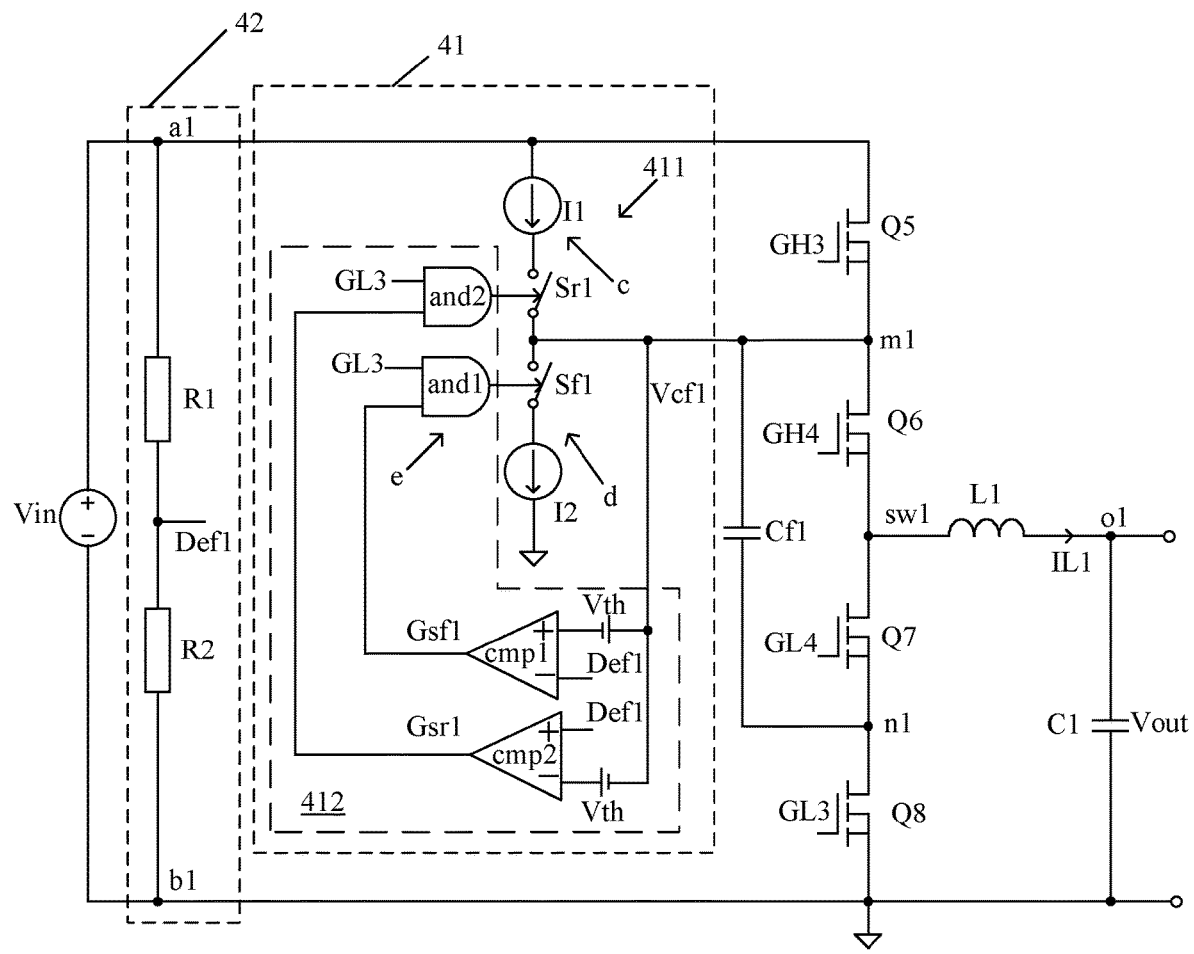
FIG. 4 is a schematic block diagram of a first example voltage balancing circuit for the three-level DC-DC converter, in accordance with embodiments of the present invention.

Referring now to FIG. 4, shown is a schematic block diagram of a first example voltage balancing circuit for the three-level DC-DC converter, in accordance with embodiments of the present invention. In this example, the three-level DC-DC converter can include voltage balancing circuit 41, switches Q5-Q8, flying capacitor Cf1, magnetic component L1, and output capacitor C1. In this particular example, switches Q5 and Q6 can be successively coupled between terminal a1 of the input port and middle terminal sw1. Switches Q7 and Q8 can be successively coupled between middle terminal sw1 and terminal b1 of the input port (e.g., the ground terminal). Flying capacitor Cf1 can connect between terminal m1 and terminal n1, in which terminal m1 is a common node of switches Q5 and Q6, and terminal n1 is a common node of switches Q7 and Q8. Magnetic component L1 can connect between middle terminal m1 and terminal o1 of the output port. Output capacitor C1 can connect between two terminals of the output port.

In this example, switching control signals GH3 and GL3 for respectively controlling switches Q5 and Q8 may be complementary, and switching control signals GH4 and GL4 for respectively controlling switches Q6 and Q7 may also be complementary. That is, switch Q5 can be turned on, while switch Q8 is turned off, and vice versa. While switch Q6 is turned on, switch Q7 can be turned off, and vice versa. Further, the duty cycles of switching control signals GH3 and GH4 for switches Q5 and Q6 may be the same. The phase difference between switching control signals GH3 and GH4 for switches Q5 and Q6 can, e.g., be 180°. In this particular example, voltage balancing circuit 41 can further charge and discharge flying capacitor Cf by forming an additional charging current path and an additional discharging current path, such that the voltage across flying capacitor Cf can be maintained to be within the predetermined range.

When switch Q8 is turned on, flying capacitor Cf can be controlled by voltage balancing circuit 41 to be additionally discharged when sampling signal Vcf1 that characterizes the voltage across flying capacitor Cf1 is greater than a parameter for characterizing the upper limit of the predetermined value, and to be additionally charged when sampling signal Vcf1 is less than a parameter for characterizing the lower limit of the predetermined value, such that the voltage across flying capacitor Cf can be maintained within the predetermined range. In this example, the predetermined value can be set as ½Vin. Also in this example, the three-level DC-DC converter can include voltage divider 42 to obtain parameter Def1 that characterizes the predetermined value. Voltage divider 42 can include resistors R1 and R2. It should be understood that other circuits that can obtain the parameter that characterizes the predetermined value can also be applied here.

Voltage balancing circuit 41 can include charge and discharge circuit 411 and controller 412. Charge and discharge circuit 411 can include charge circuit "c" and discharge circuit "d." Charge circuit c can include current source I1 and switch Sr1, coupled in series between terminal a1 of the input port and common node m1 of switches Q5 and Q6. Discharge circuit d can include current source I2 and switch Sf1, coupled in series between common node m1 of switches Q5 and Q6 and ground. In this example, controller 412 can control charge and discharge circuit 411 to charge and discharge flying capacitor Cf1. Alternatively, current sources I1 and I2 may be replaced with resistors in some cases.

In this particular example, controller 412 can include comparator cmp1, comparator cmp2 and logic circuit "e." Logic circuit e can include AND-gates and1 and and2. Comparator com1 can receive voltage Vcf1-Vth and parameter Def1 for characterizing the predetermined value, and may generate comparison signal Gsf1. It should be understood that the parameter for characterizing the upper limit of the predetermined value can be set as Def1+Vth. When Vcf1>Def1+Vth, comparison signal Gsf1 generated by comparator cmp1 can be at a high level. Comparator com2 can receive voltage Vcf1+Vth and parameter Def1 for characterizing the predetermined value, and may generate comparison signal Gsr1. It should be understood that the parameter for characterizing the lower limit of the predetermined value can be set as Def1-Vth. When Vcf1<Def1-Vth, comparison signal Gsr1 generated by comparator cmp2 may be at a high level.

AND-gate and1 can receive comparison signal Gsf1 and switching control signal GL3 for switch Q8, and may generate a first control signal for controlling discharge circuit d. AND-gate and2 can receive comparison signal Gsr1 and switching control signal GL3 for switch Q8, and may generate a second control signal for controlling charge circuit c. For example, sampling signal Vcf1 can be obtained by sampling the voltage at terminal m1. Thus, the voltage at terminal m1 can accurately characterize the voltage across flying capacitor Cf1 only when switch Q8 is turned on. It should be understood that the logic circuit in this example may not be limited to AND-gates, and other logic circuit(s) that can achieve the above function can also be applied here.

Due to parasitic parameters in the circuit and errors in each device, the voltage across flying capacitor Cf1 may be greater than the upper limit of the predetermined value. When sampling signal Vcf1 that characterizes the voltage across flying capacitor Cf1 is greater than the parameter Def1+Vth that characterizes the upper limit of the predetermined value, comparison signal Gsf1 generated by comparator cmp1 can be at a high level. At this time, if switching control signal GL3 for switch Q8 is also at a high level, the first control signal generated by AND-gate and1 can be at a high level to turn on switch Sf1. Thus, flying capacitor Cf1 can be discharged to reduce the total amount of charge, thereby reducing the voltage across flying capacitor Cf1 to be within the predetermined range.

Due to parasitic parameters in the circuit and errors in each device, the voltage across flying capacitor Cf1 may be less than the lower limit of the predetermined value. When sampling signal Vcf1 that characterizes the voltage across flying capacitor Cf1 is less than the parameter Def1-Vth that characterizes the lower limit of the predetermined value, comparison signal Gsr1 generated by comparator cmp2 may be at a high level. At this time, if switching control signal GL3 for switch Q8 is also at a high level, the second control signal generated by AND-gate and2 can be at a high level to turn on switch Sr1. Thus, flying capacitor Cf1 can be charged to increase the total amount of charge, thereby increasing the voltage across flying capacitor Cf to be within the predetermined range. In this example, the voltage balancing circuit can form the additional charging current path and the additional discharging current path to charge and discharge flying capacitor Cf1, such that the voltage across flying capacitor Cf1 can be maintained to be within the predetermined range. In particular embodiments, the three-level DC-DC converter has a relatively simple circuit structure, thereby reducing manufacturing costs.

Figure 5:
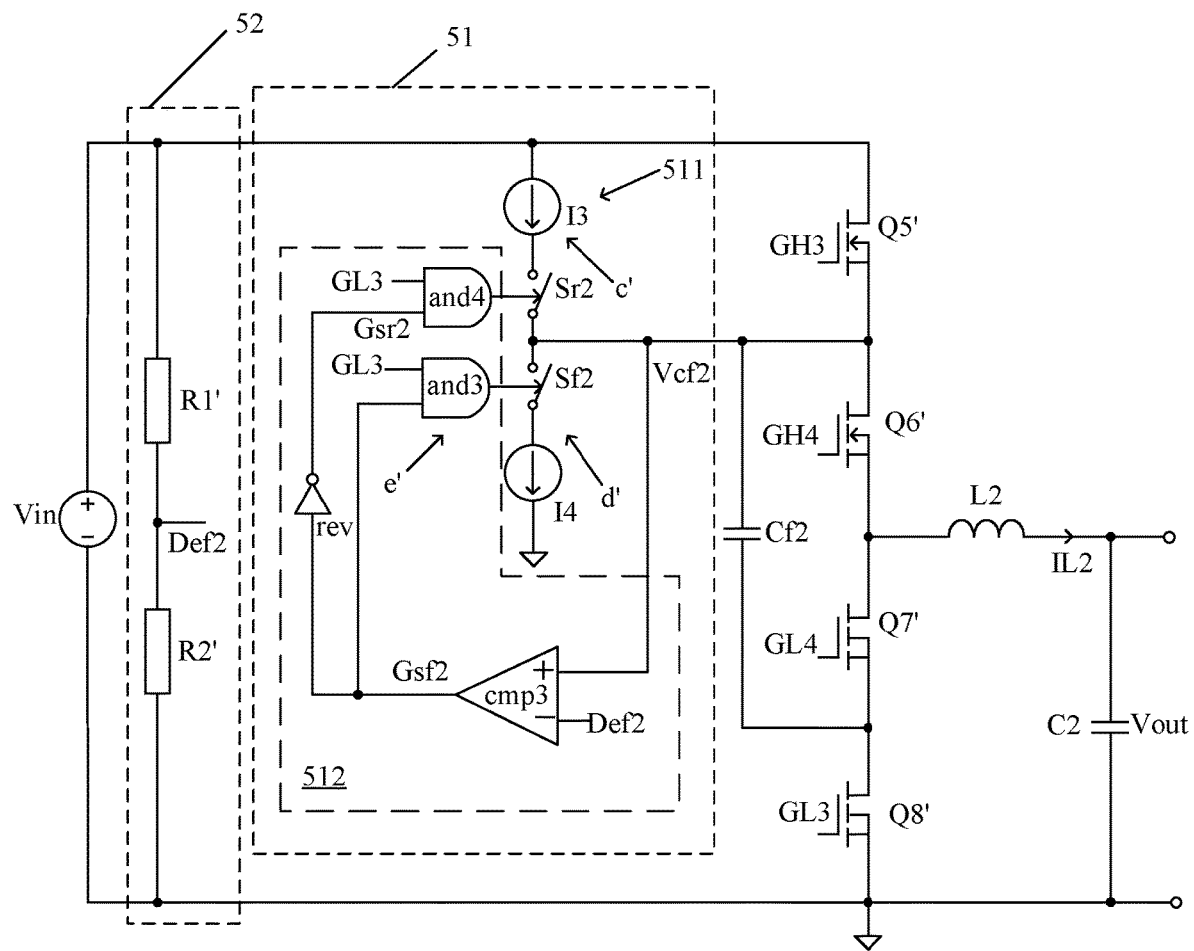
FIG. 5 is a schematic block diagram of a second example voltage balancing circuit for the three-level DC-DC converter, in accordance with embodiments of the present invention.

Referring now to FIG. 5, shown is a second example voltage balancing circuit for the three-level DC-DC converter, in accordance with embodiments of the present invention. Here, the connections of switches Q5'-Q8', flying capacitor Cf2, magnetic component L2, and output capacitor C2 of the three-level DC-DC converter are the same as switches Q5-Q8, flying capacitor Cf1, magnetic component L1 and output capacitor C1 of FIG. 4, and the switching control signals for switches Q5'-Q8' are also the same with switching control signal for switches Q5-Q8 in FIG. 4. In this particular example, voltage balancing circuit 51 can charge and discharge flying capacitor Cf2 by forming an additional charging current path and an additional discharging current path, in order to maintain the voltage across flying capacitor Cf2 at the predetermined value. In this example, the predetermined value is Vin/2, and Vin is the input voltage of the three-level DC-DC converter.

Voltage balancing circuit 51 can adjust the charge amount of flying capacitor Cf2 during the charge stage, or the discharge amount of flying capacitor Cf2 during the discharge stage based on the error between the voltage across flying capacitor Cf2 and the predetermined value, in order to maintain the voltage across the flying capacitor at the predetermined value. In this example, when switch Q8' is turned on, flying capacitor Cf2 can be controlled by voltage balancing circuit 51 to be additionally discharged when sampling signal Vcf2 that characterizes the voltage across flying capacitor Cf2 is greater than the parameter for charactering the predetermined value, and to be additionally charged when sampling signal Vcf2 is less than the parameter for charactering the predetermined value, such that the voltage across flying capacitor Cf2 can be maintained at the predetermined value.

In this particular example, the three-level DC-DC converter can also include voltage divider 52 to obtain parameter Def2 that characterizes the predetermined value. Voltage divider 52 can include resistors R1' and R2'. It should be understood that other circuits that can obtain the parameter that characterizes the predetermined value can also be applied here. Voltage balancing circuit 51 can include charge and discharge circuit 511 and controller 512. Charge and discharge circuit 511 can include charge circuit c' and discharge circuit d'. Charge circuit c' can include current source I3 and switch Sr2. Discharge circuit d' can include current source I4 and switch Sf2. In this example, controller 512 can control charge and discharge circuit 511 to charge and discharge flying capacitor Cf2. Alternatively, current sources I3 and I4 can be replaced with resistors in some cases.

In this particular example, controller 512 can include comparator cmp3 and logic circuit e'. Logic circuit e' can include inverter rev and AND-gates and3 and and4. Comparator cmp3 can receive voltage Vcf2 and parameter Def2 for characterizing the predetermined value, and generate third comparison signal Gsf2. Inverter rev can invert comparison signal Gsf2, and may generate control signal Gsr2. AND-gate and3 can receive comparison signal Gsf2 and switching control signal GL3 for switch Q8', and may generate a third control signal for controlling discharge circuit d'. AND-gate and4 can receive control signal Gsr2 and switching control signal GL3 for switch Q8', and may generate a fourth control signal for controlling charge circuit c'. It should be understood that the logic circuit in this example may not be limited to AND-gates, and other logic circuit(s) that can achieve the above function can also be applied here.

Due to parasitic parameters in the circuit and errors in each device, the voltage across flying capacitor Cf2 may be greater than the predetermined value. When sampling signal Vcf2 that characterizes the voltage across flying capacitor Cf2 is greater than parameter Def2 that characterizes the predetermined value, comparison signal Gsf2 generated by comparator cmp3 can be at a high level. Then, control signal Gsr2 can be at a low level. At this time, if switching control signal GL3 for switch Q8' is also at a high level, the third control signal generated by AND-gate and3 can be at a high level to turn on switch Sf2, such that flying capacitor Cf2 can be discharged to reduce the total amount of charge, and thereby reducing the voltage across flying capacitor Cf to the predetermined value.

Due to parasitic parameters in the circuit and errors in each device, the voltage across flying capacitor Cf2 may be less than the predetermined value. When sampling signal Vcf2 that characterizes the voltage across flying capacitor Cf2 is less than parameter Def2 that characterizes the predetermined value, comparison signal Gsf2 generated by comparator cmp3 can be at a low level. Then, control signal Gsr2 can be at a high level. At this time, if switching control signal GL3 for switch Q8' is also at a high level, the fourth control signal generated by AND-gate and4 can be at a high level to turn on switch Sr2, such that flying capacitor Cf1 can be charged to increase the total amount of charge, thereby increasing the voltage across flying capacitor Cf to the predetermined value. The three-level DC-DC in this example has a relatively structure, and is facilitated by the control method of voltage balancing circuit 51, thereby further reducing associated circuit manufacturing costs.

Figure 6:
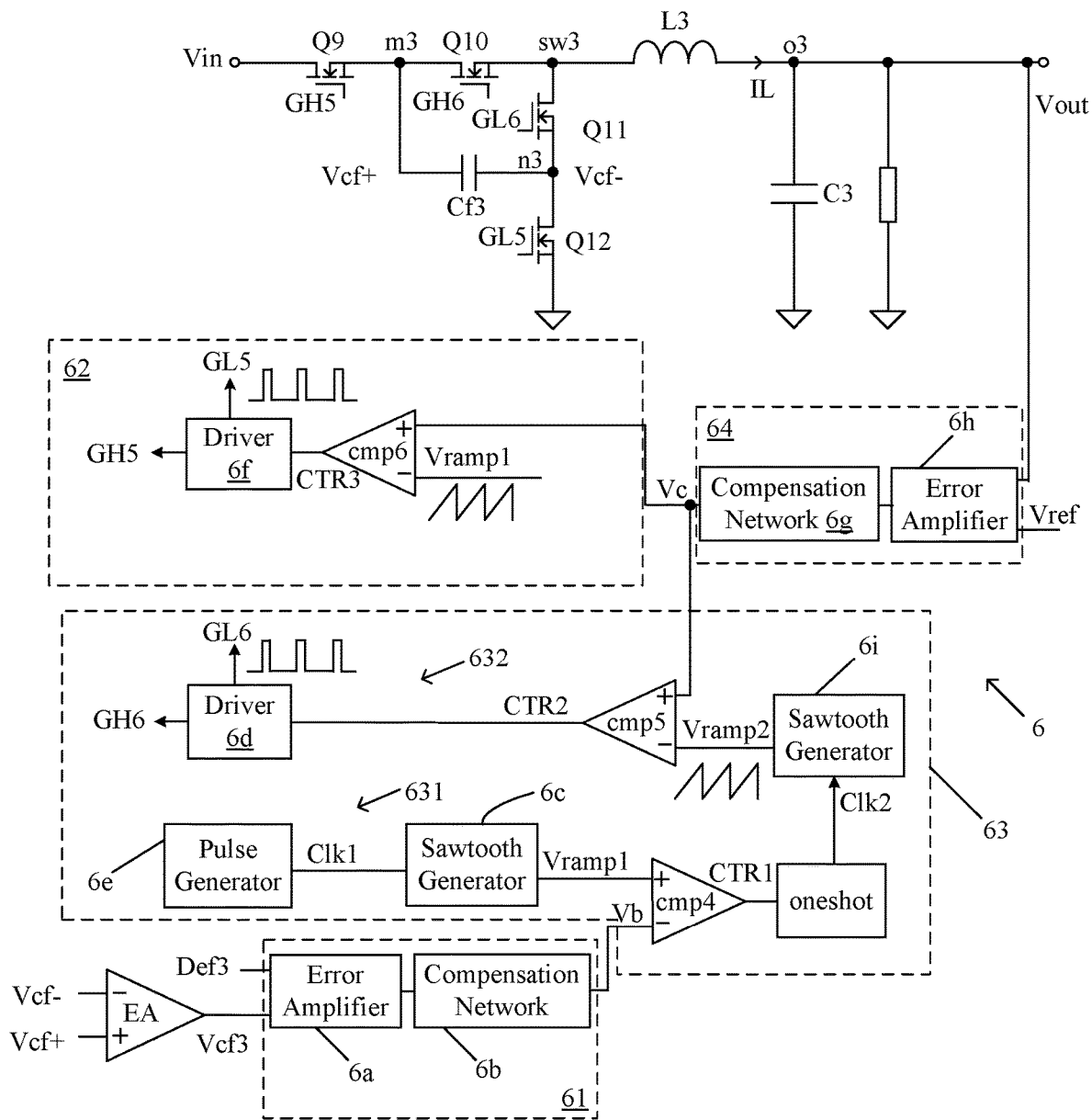
FIG. 6 is a schematic block diagram of a third example voltage balancing circuit for the three-level DC-DC converter, in accordance with embodiments of the present invention.

Referring now to FIG. 6, shown is a schematic block diagram of a third example voltage balancing circuit for the three-level DC-DC converter, in accordance with embodiments of the present invention. In this example, the three-level DC-DC converter can include voltage balancing circuit 6, switches Q9-Q12, flying capacitor Cf3, magnetic component L3, and output capacitor C3. Switches Q9 and Q10 can be successively coupled in series between the input port and middle terminal sw3, and switches Q11 and Q12 can be successively coupled in series between middle terminal sw3 and the ground terminal. Also, flying capacitor Cf3 can connect between terminal m3 and terminal n3, in which terminal m3 is a common node of switches Q9 and Q10, and terminal n3 is a common node of switches Q11 and Q12. Magnetic component L3 can connect between middle terminal sw3 and terminal o3 of the output port. Output capacitor C3 can connect between two terminals of the output port.

In this example, switching control signals GH5 and GL5 for respectively controlling switches Q9 and Q12 may be complementary, and switching control signals GH6 and GL6 for respectively controlling switches Q10 and Q11 can also be complementary. Further, the duty cycles of switching control signals GH5 and GH6 may be the same. In this particular example, voltage balancing circuit 6 can adjust the current flowing through magnetic component L3 during the charge stage or the discharge stage of flying capacitor Cf3, in order to adjust the charge amount of flying capacitor Cf3 during the charge stage or the discharge amount of flying capacitor Cf3 during the discharge stage, such that the voltage across flying capacitor Cf3 can be maintained to be within the predetermined range. Therefore, the charge amount of flying capacitor Cf3 during the charge stage can be equal to the discharge amount of flying capacitor Cf3 during the discharge stage by adjusting the current flowing through magnetic component L3, such that the voltage across flying capacitor Cf3 can be maintained within the predetermined range.

Voltage balancing circuit 6 can include differential sampling circuit EA, error circuit 61, generating circuits 62 and 63, and compensation circuit 64. Differential sampling circuit EA can receive voltage Vcf+ and voltage Vcf− by respectively sampling the voltages at the two terminals of flying capacitor Cf3, may and generate parameter Vcf3 that characterizes the voltage across flying capacitor Cf3. Error circuit 61 can generate error signal Vb based on parameter Def3 that characterizes the predetermined value and parameter Vcf3 that characterizes the voltage across flying capacitor Cf3. Compensation circuit 64 can generate compensation signal Vc based on output voltage Vout and reference voltage Vref that characterizes an expected value of output voltage Vout. Also, generating circuit 62 can generate switching control signals GH5 and GL5 based on compensation signal Vc and clock signal Clk1, and generating circuit 63 can generate switching control signals GH6 and GL6 based on compensation signal Vc and clock signal Clk2. Clock signal Clk2 can be generated based on error signal Vb.

For example, error circuit 61 can include error amplifier 6a and compensation network 6b, in order to obtain error signal Vb. Compensation circuit 64 can include error amplifier 6h and compensation network 6g, in order to obtain compensation signal Vc. Generating circuit 63 can include clock signal generating circuit 631 and drive circuit 632. Clock signal generating circuit 631 can generate clock signal Clk2 based on error signal Vb and clock signal Clk1. Drive circuit 632 can generate switching control signals GH6 and GL6 respectively for switches Q10 and Q11 based on clock signal Clk2 and compensation signal Vc. In this example, the phase difference between clock signals Clk1 and Clk2 can be adjusted based on error signal Vb, thereby adjusting the phase difference between switching control signals GH5 and GH6 for switches Q9 and Q10, respectively.

Clock signal generating circuit 631 can include pulse generator 6e, sawtooth generator 6c, comparator cmp4, and one-shot generator "oneshot." Pulse generator 6e can generate clock signal Clk1. Sawtooth generator 6c can be controlled by clock signal Clk1 to generate sawtooth wave Vramp1. Comparator cmp4 can generate control signal CTR1 based on sawtooth signal Vramp1 and error signal Vb. One-shot generator oneshot can generate clock signal Clk2 based on control signal CTR1. In this example, drive circuit 632 can include sawtooth generator 6i, comparator cmp5, and driver 6d. Sawtooth generator 6i can be controlled by clock signal Clk2 to generate sawtooth signal Vramp2. Comparator cmp5 can generate control signal CTR2 based on sawtooth signal Vramp2 and compensation signal Vc. Driver 6d can generate switching control signals GH6 and GL6 based on CTR2. Generating circuit 62 can include comparator cmp6 and driver 6f. Comparator cmp6 can generate control signal CTR3 based on sawtooth signal Vramp1 and compensation signal Vc. Driver 6f can generate switching control signals GH5 and GL5 based on control signal CTR3.

Voltage balancing circuit 6 can adjust the phase difference between clock signals Clk1 and Clk2 based on error signal Vb, thereby adjusting the phase difference between switching control signals GH5 and GH6, respectively, for switches Q9 and Q10. Thus, the freewheeling time of the magnetic component L3 (e.g., during on-states of switches Q11 and Q12) and current IL of magnetic component L3 during the charge stage and the discharge stage of flying capacitor Cf3 can be adjusted, thereby adjusting the charge amount of flying capacitor Cf3 during the charge stage and the discharge amount of flying capacitor Cf3 during the discharge stage to maintain the voltage across flying capacitor Cf3 to be within the predetermined range. In this example, the voltage balancing circuit can maintain the voltage across flying capacitor Cf3 within the predetermined range without additionally charging and discharging flying capacitor Cf3, which may improve circuit efficiency.

Figure 7:
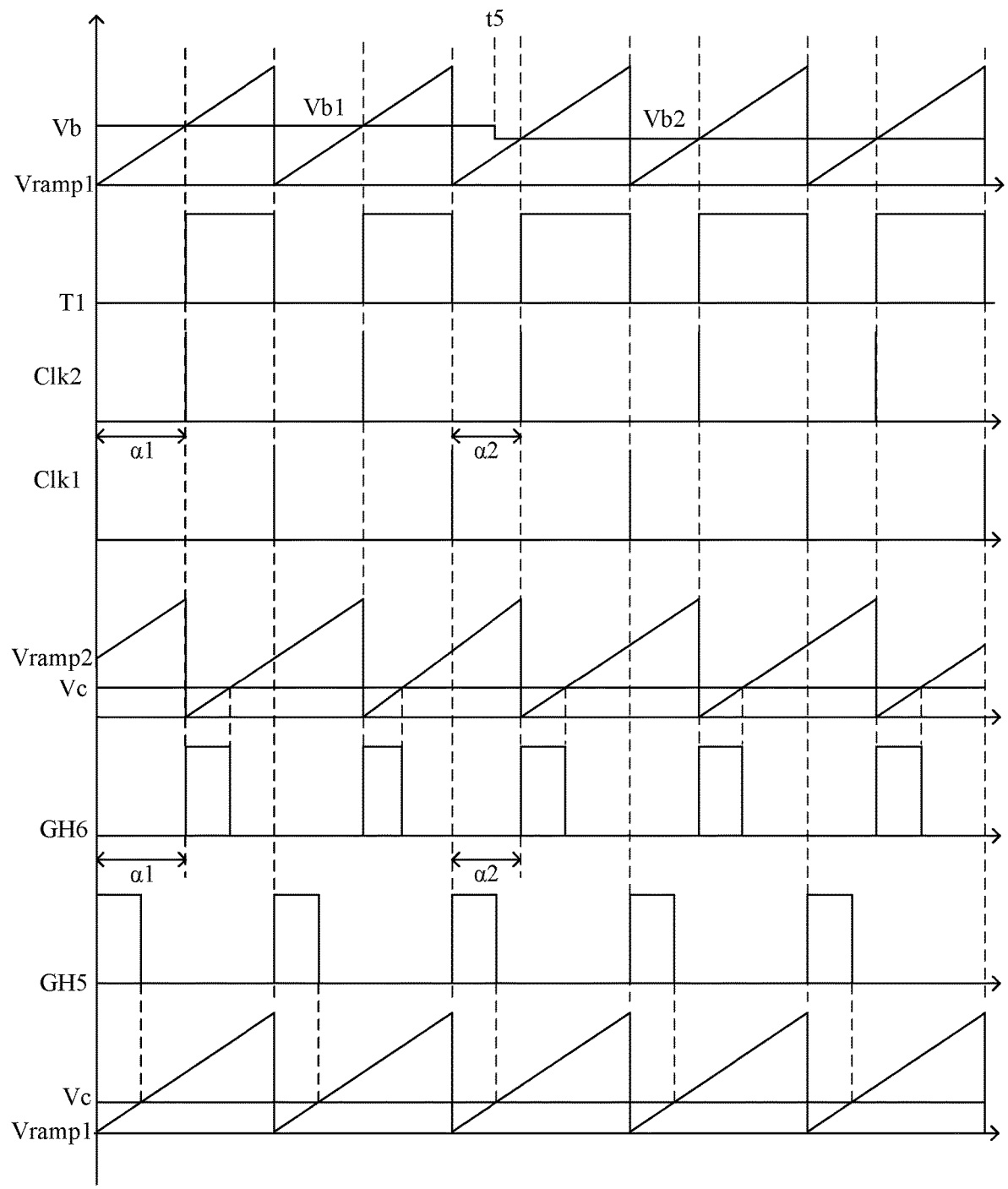
FIG. 7 is a waveform diagram of an example operation of the third example voltage balancing circuit, in accordance with embodiments of the present invention.

Referring now to FIG. 7, shown is a waveform diagram of an example operation of the third example voltage balancing circuit, in accordance with embodiments of the present invention. In this example, if error signal Vb reaches the level of Vb1, the three-level DC-DC converter can operate in a stable state; that is, the voltage across flying capacitor Cf3 is approximately equal to the predetermined value. At this time, the phase difference between switching control signals GH5 and GH6 respectively for switches Q9 and Q10 is α1. However, at time t5, error signal Vb may decrease to Vb2; that is, the voltage across flying capacitor Cf3 increases (e.g., error signal Vb can represent the difference between the predetermined value and the voltage across flying capacitor Cf3). Then, the phase difference between clock signals Clk1 and Clk2 can be changed to be α2 due to the decrease of error signal Vb, and α2<α1. Therefore, the phase difference between switching control signals GH5 and GH6 generated based on clock signal Clk1, clock signal Clk2, and compensation signal Vc can be α2. That is, when error signal Vb decreases, the phase difference between switching control signals GH5 and GH6 can be controlled to decrease.

Figure 8:
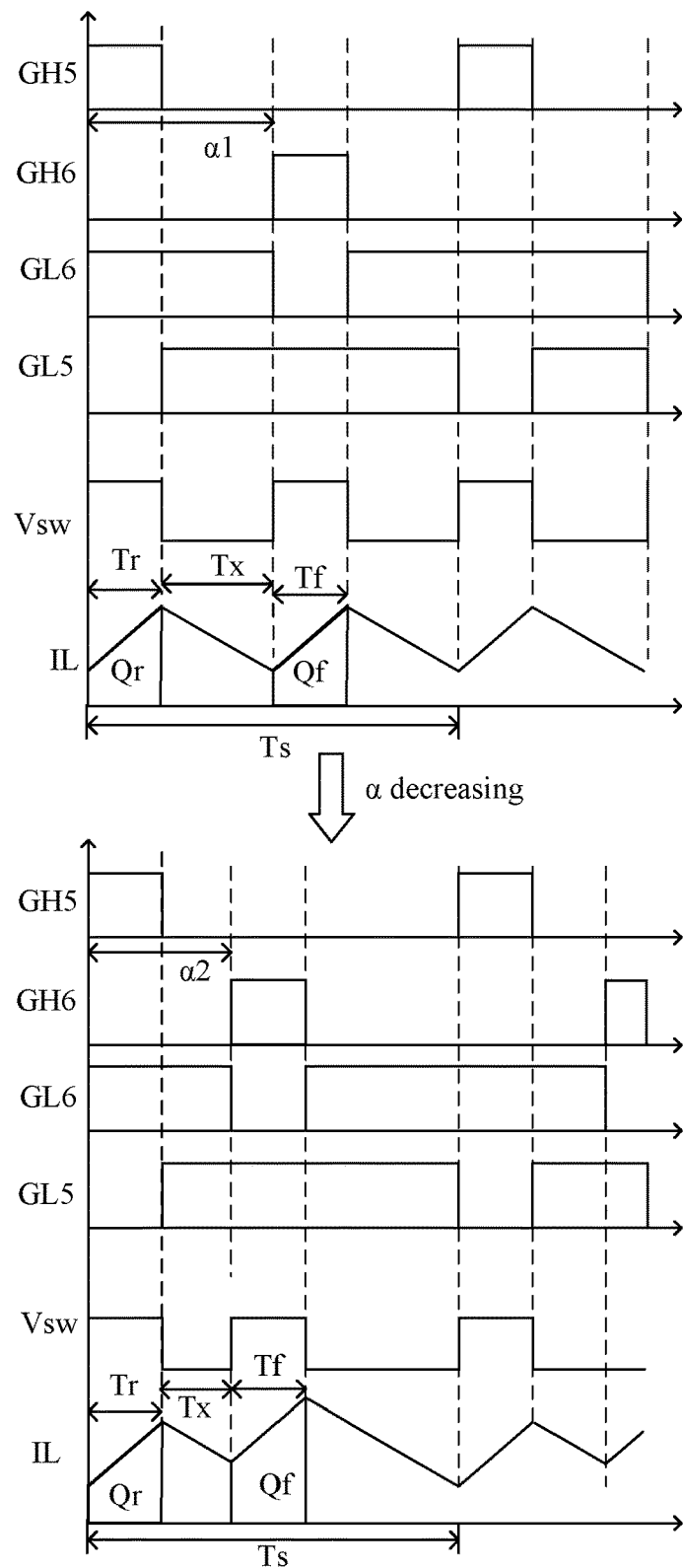
FIG. 8 is a waveform diagram of an example operation of the three-level DC-DC converter with the third example voltage balancing circuit, in accordance with embodiments of the present invention.

Referring now to FIG. 8, shown is a waveform diagram of an example operation of the three-level DC-DC converter with the third example voltage balancing circuit, in accordance with embodiments of the present invention. In this example, the effect of the change in the phase difference between switching control signals GH5 and GH6 on the voltage across flying capacitor Cf3 is shown. The duty cycles of switching control signals GH5 and GH6 may all be equal to D (D<0.5). After the phase difference between switching control signals GH5 and GH6 decreases from α1 to α2, charge time Tr and discharge time Tf of flying capacitor Cf3 can be unchanged since duty cycle D is unchanged.

Freewheeling time Tx (e.g., only switches Q11 and Q12 are turned on) of magnetic component L3 can decrease during that time, such that the average current flowing through magnetic component L3 during the discharge stage of flying capacitor Cf3 is greater than the average current flowing through magnetic component L3 during the charge stage of flying capacitor Cf3. That is, charge amount Qr (e.g., the integration of current IL of magnetic component L3 with charge time Tr) charged into flying capacitor Cf3 during the charge stage is less than discharge amount Qf (e.g., the integration of current IL of magnetic component L3 with discharge time Tf) discharged by flying capacitor Cf3 during the discharge stage. Thus, the total amount of charge of flying capacitor Cf3 can be reduced, thereby reducing the voltage across flying capacitor Cf3 to the predetermined range.

Similarly, when the voltage across flying capacitor Cf3 decreases (e.g., less than the predetermined range), error signal Vb can increase, and then the phase difference between switching control signals GH5 and GH6 respectively for switches Q9 and Q10 can be controlled to increase, such that freewheeling time Tx (e.g., only switches Q11 and Q12 are turned on) of magnetic component L3 can increase. Thus, the average current flowing through magnetic component L3 during the discharge stage of flying capacitor Cf3 is less than the average current flowing through magnetic component L3 during the charge stage of flying capacitor Cf3. That is, charge amount Qr (e.g., the integration of current IL of magnetic component L3 with charge time Tr) charged into flying capacitor Cf3 during the charge stage is greater than discharge amount Qf (e.g., the integration of current IL of magnetic component L3 with discharge time Tf) discharged by flying capacitor Cf3 during the discharge stage, such that the total amount of charge of flying capacitor Cf3 can be increased, thereby increasing the voltage across flying capacitor Cf3 to the predetermined range.

Particular embodiments may also be applicable to the condition that duty cycle D of the switching control signals for switches Q9 and Q10 is not less than 0.5. In this example, the voltage balancing circuit can maintain the voltage across flying capacitor Cf3 within the predetermined range by adjusting the average current flowing through magnetic component L3, and without additionally charging and discharging flying capacitor Cf3, thereby improving the efficiency of the circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A three-level DC-DC converter, comprising:
   a) first and second switches successively coupled between a first terminal of an input port and a middle terminal;
   b) third and fourth switches successively coupled between said middle terminal and a second terminal of said input port;
   c) a flying capacitor coupled between a common node of said first and second switches and a common node of said third and fourth switches;
   d) a voltage balancing circuit configured to adjust a charge amount or a discharge amount of said flying capacitor during normal operation based on an error signal characterizing an error between a voltage across said flying capacitor and a predetermined value, in order to maintain said voltage across said flying capacitor within a predetermined range, wherein said predetermined value is within said predetermined range, wherein during said normal operation, said first, second, third, and fourth switches are turned on and off in order to maintain an expected output voltage; and
   e) wherein said voltage balancing circuit comprises a first controller configured to generate first and second control signals in accordance with a first sampling signal for characterizing said voltage across said flying capacitor, said predetermined value, and a switching control signal of said fourth switch.

2. The three-level DC-DC converter of claim 1, wherein:
   a) said voltage balancing circuit is configured to adjust a current flowing through a magnetic component during a charge stage or a discharge stage of said flying capacitor, in order to adjust said charge amount of said flying capacitor during said charge stage or said discharge amount of said flying capacitor during said discharge stage; and
   b) said magnetic component is coupled between said middle terminal and a first terminal of an output port.

3. The three-level DC-DC converter of claim 2, wherein said charge amount of said flying capacitor during said charge stage is adjusted to be the same with said discharge amount of said flying capacitor during said discharge stage.

4. The three-level DC-DC converter of claim of claim 1, wherein:
   a) switching control signals for respectively controlling said first and fourth switches are complementary;
   b) switching control signals for respectively controlling said second and third switches are complementary; and
   c) duty cycles of switching control signals respectively for controlling said first and second switches are the same.

5. The three-level DC-DC converter of claim 1, wherein said predetermined value is set to be half of an input voltage of said three-level DC-DC converter.

6. The three-level DC-DC converter of claim 5, wherein switching control signals respectively for controlling said first and second switches is 180°.

7. The three-level DC-DC converter of claim 1, wherein said voltage balancing circuit is configured to additionally charge and discharge said flying capacitor in accordance with a first sampling signal for characterizing said voltage across said flying capacitor and a parameter for characterizing said predetermined value, in order to maintain said voltage across said flying capacitor within said predetermined range.

8. The three-level DC-DC converter of claim 7, wherein:
   a) when said fourth switch is turned on and said first sampling signal is greater than a first reference value, said flying capacitor is controlled to be additionally discharged; and
   b) when said fourth switch is turned on and said first sampling signal is less than a second reference value, said flying capacitor is controlled to be additionally charged.

9. The three-level DC-DC converter of claim 8, wherein said first reference value is a parameter for characterizing an upper limit of said predetermined value, and said second reference value is a parameter for characterizing a lower limit of said predetermined value.

10. The three-level DC-DC converter of claim 8, wherein said voltage balancing circuit comprises:
    a) a first controller configured to generate first and second control signals in accordance with said first sampling signal, said predetermined value, and a switching control signal of said fourth switch; and b) a first charge and discharge circuit configured to additionally discharge and charge said flying capacitor in accordance with said first and second control signals.

11. The three-level DC-DC converter of claim 10, wherein said first controller comprises:
a) a first comparator configured to compare said first sampling signal against a first reference value, and to generate a first comparison signal;
b) a second comparator configured to compare said first sampling signal against a second reference value, and to generate a second comparison; and
c) a first logic circuit configured to generate said first and second control signals based on said first and second comparison signals and said switching control signal for said fourth switch.

12. The three-level DC-DC converter of claim 10, wherein said first charge and discharge circuit comprises:
a) a first discharge circuit coupled between said middle terminal and said second terminal of said input port, and being configured to additionally discharge said flying capacitor in accordance with said first control signal; and
b) a first charge circuit coupled between said middle terminal and said first terminal of said input port, and being configured to additionally charge said flying capacitor in accordance with said second control signal.

13. The three-level DC-DC converter of claim 1, wherein said voltage balancing circuit comprises a first charge and discharge circuit configured to additionally discharge and charge said flying capacitor in accordance with said first and second control signals.

14. The three-level DC-DC converter of claim 1, wherein duty cycles of said first, second, third, and fourth switches are independent of said error signal.

15. A three-level DC-DC converter, comprising:
a) first and second switches successively coupled between a first terminal of an input port and a middle terminal;
b) third and fourth switches successively coupled between said middle terminal and a second terminal of said input port;
c) a flying capacitor coupled between a common node of said first and second switches and a common node of said third and fourth switches;
d) a voltage balancing circuit configured to adjust a charge amount or a discharge amount of said flying capacitor during normal operation based on an error signal characterizing an error between a voltage across said flying capacitor and a predetermined value, in order to maintain said voltage across said flying capacitor within a predetermined range, wherein said predetermined value is within said predetermined range, wherein during said normal operation, said first, second, third, and fourth switches are turned on and off in order to maintain an expected output voltage;
e) a magnetic component, coupled between said middle terminal and a first terminal of an output port; and
f) wherein said voltage balancing circuit is configured to adjust a current flowing through said magnetic component only by adjusting a phase difference between switching control signals for respectively controlling said first and second switches according to said error signal without adjusting a duty cycle of said switching control signals.

16. The three-level DC-DC converter of claim 15, wherein said voltage balancing circuit is configured to:
a) adjust said phase difference between said switching control signals for respectively controlling said first and second switches to increase when said error signal is increased; and
b) adjust said phase difference to decrease when said error signal is decreased.

17. The three-level DC-DC converter of claim 15, wherein said voltage balancing circuit comprises:
a) an error circuit configured to generate said error signal in accordance with a first sampling signal for characterizing said voltage across said flying capacitor and said parameter for characterizing said predetermined value;
b) a first generating circuit configured to generate switching control signals for respectively controlling said first and fourth switches, in accordance with a compensation signal for characterizing a difference between an output voltage and an expected value of said output voltage, and a first clock signal; and
c) a second generating circuit configured to generate switching control signals for respectively controlling said second and third switches, in accordance with said compensation signal and said error signal.

18. The three-level DC-DC converter of claim 17, wherein said second generating circuit comprises:
a) a clock signal generating circuit configured to generate a second clock signal in accordance with said first clock signal and said error signal; and
b) a drive circuit configured to generate said switching control signals for respectively controlling said second and third switches in accordance with said second clock signal and said compensation signal, wherein a phase difference between said first and second clock signals is adjusted in accordance with said error signal, thereby adjusting said phase difference between said switching control signals for respectively controlling said first and second switches.

* * * * *